United States Patent
Naaktgeboren et al.

(10) Patent No.: US 6,209,450 B1
(45) Date of Patent: Apr. 3, 2001

(54) ROUND BALER WITH IMPROVED TWINE WRAP CONTROL

(75) Inventors: Adrianus Naaktgeboren, Varsenare (BE); Mark Kei-Peing Chow, Paoli, PA (US); Jan Cornelis Van Groenigen, Varsenare (BE); Dirk André René Vandamme, Blankenberge (BE); Johan Adolf Eric Vande Ryse, Brugge (BE); Danny Noël Oscar Claeys, Oedelem (BE)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/362,723

(22) Filed: Jul. 29, 1999

Related U.S. Application Data
(60) Provisional application No. 60/095,038, filed on Aug. 3, 1998.

(51) Int. Cl.[7] ............................. A01F 15/07; B65B 13/04; B65B 63/04
(52) U.S. Cl. .................................. 100/4; 53/587; 56/341; 100/5
(58) Field of Search ............................. 100/4, 5, 13, 88; 53/587; 56/341

(56) References Cited

U.S. PATENT DOCUMENTS

| | | | |
|---|---|---|---|
| 4,402,259 | * | 9/1983 | Viaud ........................................ 100/5 |
| 4,557,189 | * | 12/1985 | Schaible ................................... 100/5 |
| 4,627,340 | * | 12/1986 | Glass et al. .............................. 100/5 |
| 4,656,931 | * | 4/1987 | Van Den Bossche et al. .......... 100/4 |
| 4,674,403 | * | 6/1987 | Bryant et al. ............................ 100/4 |
| 5,152,123 | * | 10/1992 | Viaud et al. ............................. 100/4 |
| 5,231,828 | * | 8/1993 | Swearingen et al. .................... 100/5 |
| 5,388,504 | * | 2/1995 | Kluver ...................................... 100/4 |
| 5,551,218 | * | 9/1996 | Henderson et al. ..................... 100/4 |
| 5,581,974 | * | 12/1996 | Underhill et al. ....................... 53/587 |
| 5,631,826 | * | 5/1997 | Chow ....................................... 100/4 |
| 6,050,052 | * | 4/2000 | Herron et al. ........................... 53/587 |

FOREIGN PATENT DOCUMENTS

0271390 * 6/1988 (EP) ........................................ 100/4

OTHER PUBLICATIONS

New Holland 544, Operator's Manual, 1st Edition Dec. 1996, pp. 2–1 to 2–13.

* cited by examiner

Primary Examiner—Stephen F. Gerrity
(74) Attorney, Agent, or Firm—Griffin & Szipl, P.C.

(57) ABSTRACT

A baler (10) for wrapping a rotating bale (52) of crop material (26) with strands of twine (72) has two twine tubes (68) through which the twine is fed so that ends of the strands dangle from the tubes. A bale density sensor (36) senses bale density and a controller (42) compares the sensed density with a desired density selected by an operator via an operator control panel (34). When the sensed density reaches about half the desired density the twine tubes are moved to a twine insert position so that the ends of the strands dangle adjacent the rotating bale. When a full bale has been formed, a duckbill (60) is actuated to push the ends of the strands toward the bale where they are caught up in the crop material. If either strand is not caught up in the rotating bale, the operator may abort the wrap cycle and initiate a new wrap cycle by pressing a wrap key on the control panel. The twine tubes are moved to a twine cut position, the twine is cut, the twine tubes returned to the twine insert position, and the duckbill is again actuated to push the strand ends toward the bale.

13 Claims, 10 Drawing Sheets

ROUND BALER WITH IMPROVED TWINE WRAP CONTROL

RELATED APPLICATIONS

This application claims benefit of provisional No. 60/095,038 filed Aug. 3, 1998, the disclosure of which is incorporated herein by reference.

FIELD OF THE INVENTION

This invention relates to agricultural balers for forming round bales of crop material and automatically wrapping the bales with twine before releasing them onto a field. More particularly, the invention relates to improvements in the twine wrapper control system to (1) improve the chances that the end of the twine will be caught up in a rotating bale at the start of a wrapping cycle and (2) provide for quick restarting of a wrapping cycle in the event the twine is not caught up.

BACKGROUND OF THE INVENTION

Typical automatic round balers, such as the models 544 and 5930 commercially available from New Holland North America, pick up crop material from a field and form it into a compacted round bale in a bale forming chamber. When the bale has been compacted to a desired density (or reached a desired size), bale density (or size) sensors send signals to a controller which in turn sends a signal to an operator's panel to signal the operator to stop forward motion of the baler so that the bale may be wrapped with netting or twine according to a program of instructions stored in a controller memory.

After a brief delay allowing time for the operator to stop forward motion of the baler, the controller initiates a wrap cycle. The mechanism for wrapping with twine includes two hollow twine tubes. Two strands of twine are fed from two twine rolls through the tubes. When a wrap cycle is initiated, the twine tubes are moved arcuately to an extended or insert position with an end of one strand dangling from the end of a respective one of the tubes. A pusher mechanism, usually referred to as a "duckbill", is actuated to move the dangling ends toward the bale so that the ends of the twine strands are adjacent the bale near its lengthwise middle. The strands are caught up in the bale which is rotating within the bale forming chamber. The bale is then wrapped in a pattern by moving the twine tubes toward a home position with programmed pauses at intervals to place circular wraps on the bale. The twine is cut after end wraps have been placed on the bale.

As the twine tubes move toward their home positions, each twine strand slides into a spring clamp and hold device so that the twine ends can not be caught up in moving machine parts after the strands are cut. Each twine is pulled out of its respective clamp and hold device at the beginning of the next wrap cycle as the twine tube arms are extended to the insert position.

It has been found that a frequent cause of failure in wrapping is due to the fact that the end of a strand does not drop quickly enough after being pulled free of its clamping device. As a result, the strand end drops onto the top of the duckbill rather than dangling in a position where it can be pushed toward the bale by the duckbill.

Hence there is a need for a system wherein the chance of failures in inserting the ends of the twine strands is considerably reduced.

The pattern in which the bale is wrapped is determined by a stored program in the controller. This program may be a factory-installed program, a "learned" program generated by manually controlling movement of the twine tubes to place the desired wrap pattern on a bale, or a factory-installed program which permits operator selection of the number of end wraps to be placed on a bale. In any event, the programs provide no easy method for restarting a twine wrap cycle to re-tie a bale in the event one or both strand ends are not caught up in the rotating bale.

Currently, the operator may wait until the selected twine pattern program completes its automatic wrap cycle and then restart the wrap cycle by actuating, for two seconds, a Wrap key on an operator's control panel. This procedure wastes a considerable amount of twine if one twine was caught up in the rotating bale. Alternatively, the operator could manually return the twine tubes to their home position by (1) actuating a Retract key on the operator's control panel to retract the twine tubes to their home position, (2) switching the controller to the net wrap mode by actuating a Net/Twine key, (3) again actuating the Retract key to return the duckbill to the home position and cut the twine, (4) actuating a Clear key to clear the error alarm and error message displayed on the operator's control panel (caused by interruption of the wrap cycle), (5) actuating the Net/Twine key to return the controller to the twine mode, and (6) initiating a new wrap cycle by actuating the Wrap key for two seconds. This complex procedure would require a very skilled and knowledgeable operator and wastes considerable time. It also wastes twine if one strand is started but, as compared to the first procedure, results in less waste.

Consequently, there is also a need for a round baler wherein the time needed to remedy failures in inserting the ends of the wrapping twine strands is considerably reduced.

SUMMARY OF THE INVENTION

An object of the present invention is to provide a round baler wherein failures in inserting the ends of the wrapping twine strands is considerably reduced.

According to the invention, a bale wrapping system for wrapping a rotating bale of crop material with at least one strand of twine comprises: at least one twine dispensing arm for presenting at least one strand of twine so that an end of the strand may dangle from the arm, the arm being movable between a home position and a twine insert position where the end of the strand dangles adjacent the rotating bale; a twine pusher movable toward the rotating bale to push the dangling end of the strand toward the rotating bale; a sensor for sensing a bale parameter which increases as the rotating bale is being formed so as to reach a desired value when the rotating bale is fully formed; and a controller responsive to the sensor to control the twine dispensing arm to move from its home position to the twine insert position before the rotating bale is fully formed.

The bale parameter that is sensed is preferably the bale density and the controller moves the twine dispensing arm from the home position to the twine insert position when the sensed bale density exceeds about 50% of the desired value.

Another object of the invention is to provide a bale wrapping system for wrapping rotating bales of crop material, the system having two twine dispensing arms, means for moving the arms to a twine inserting position prior to the time that a complete bale has been formed to thereby position dangling twine strands for insertion, and a pusher, operable after a complete bale has been formed, for moving the dangling twine strands toward the bale.

A further object of the invention is to provide a bale wrapping system for wrapping a rotating bale of crop material with strands of twine, the bale wrapping system comprising: first and second twine dispensing arms, each arm supporting a strand of twine so that a strand end may dangle from the arm, the arms being movable between a home position and a twine insert position where the strand ends dangle adjacent a rotating bale; a pusher movable toward the rotating bale to push dangling strand ends toward the rotating bale; a bale density sensor for sensing bale density as the bale is being formed; a control panel for presetting a desired bale density value; and, a controller responsive to the bale density sensor and the desired bale density value for controlling the arms to move the arms to the twine insert position before the bale density sensed by the bale density sensor reaches the desired bale density value, and controlling the pusher to move toward the rotating bale only after the bale density sensed by the bale density sensor reaches the desired bale density value.

Another object of the invention is to provide a control system for controlling the wrapping of bales of crop material, the control system being characterized in that, in the event of a malfunction during a wrapping cycle the twine is cut, the system restored to an initial state and a new wrapping cycle initiated by merely actuating a Wrap key on an operator's control panel.

DETAILED DESCRIPTION OF THE INVENTION

Figure 1:
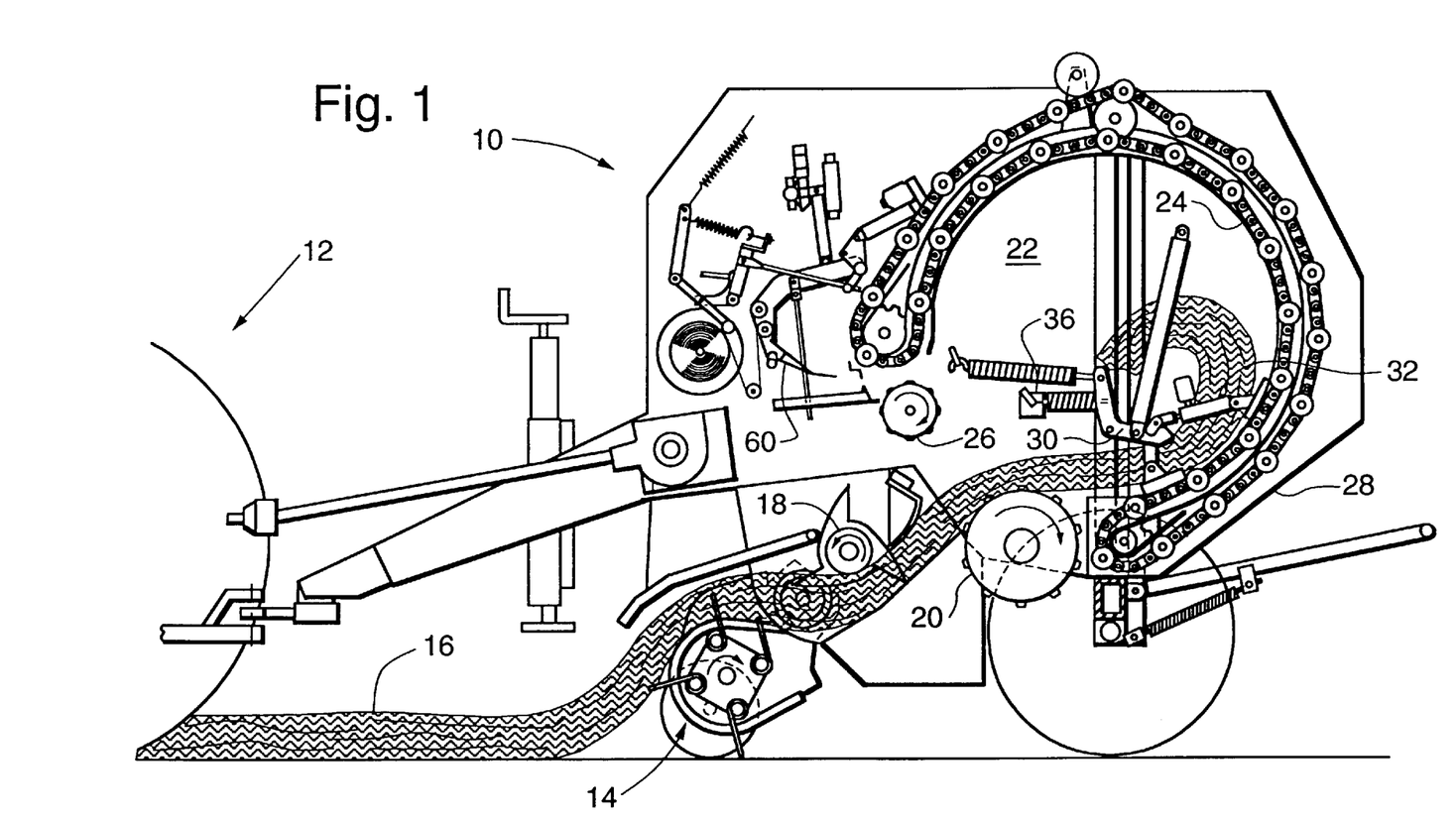
FIG. 1 is a schematic side elevation view of a round baler.

FIG. 1 schematically illustrates a baler 10 such as the New Holland model 544 automatic round baler which is adapted to be pulled by, and powered from, a tractor 12. A pickup assembly 14, having cross conveying augers (not shown), picks up crop material 16 and feeds it via a feed rotor 18 and a rotating floor roll 20 into a bale forming chamber 22. Within chamber 22, the crop material at first curls freely under the combined action of the floor roll 20, a chain conveyor 24 and a rotating stripper roll 26, and packs loosely under its own weight until chamber 22 is filled. As more crop material is fed into the chamber the crop material is compacted and exerts a force against a tailgate 28 tending to open the tailgate. The tailgate is hooked up by a tailgate latch 30 attached to the main frame of the baler and a density cylinder 32 is attached to the tailgate. The tailgate is allowed to release slightly but is still held in latch 30 so that pressure exerted on the tailgate by the bale pulls on and extends cylinder 32 against the pressure in the gas accumulator on the cylinder. Two latch sensor switches 31, 33 (FIG. 6) are provided, one switch at each side of the baler, to detect when the tailgate is latched.

Figure 8:
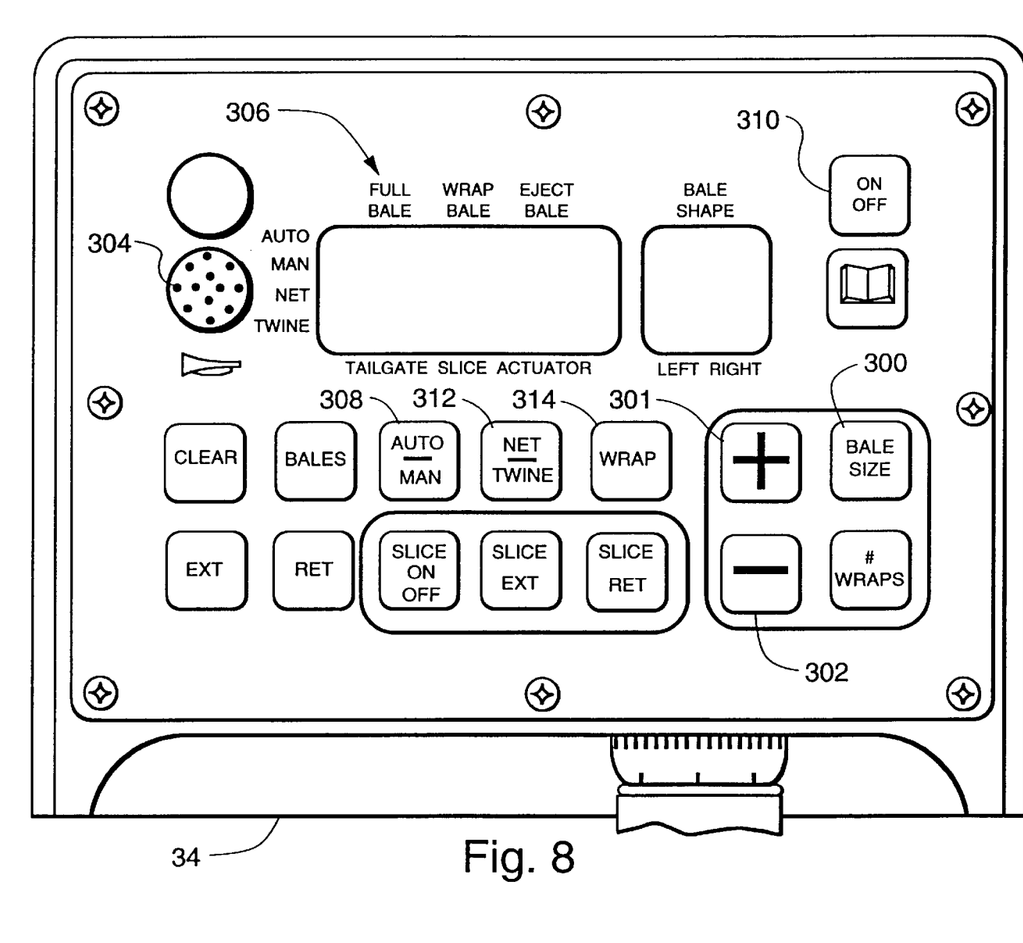

A bale parameter value, indicating a full or complete bale, is set by an operator by actuating Bale Size, "+" and "−" keys 300, 301 and 302 on an operator's keyboard or control panel 34 (FIG. 8). This parameter may be bale size but preferably is bale density. Two bale parameter sensors 36 are provided, one at each side of the baler, for sensing a bale parameter. The sensors include respective potentiometers 38,40 (FIG. 6) for producing analog electrical signals indicating the sensed density. A controller 42 includes a microprocessor 46 which first converts the analog signals to digital values and then compares the sensed density with the desired bale density. When the two are equal the operator is signaled to stop forward motion of the baler by energizing an audible signal generator 304 and a "full bale" indicator light 306 on the operator's control panel 34.

The controller waits a short interval (say 0.75 second) to allow the operator time to stop forward motion of the baler and then automatically initiates a bale wrapping cycle to wrap the bale with net or twine depending on which wrapping material the operator has selected by operation of a Net/Twine key 312 (FIG. 8). The term "twine" as used herein means any suitable strand-like material such as conventional twine, plastic material and wire.

Figure 6:
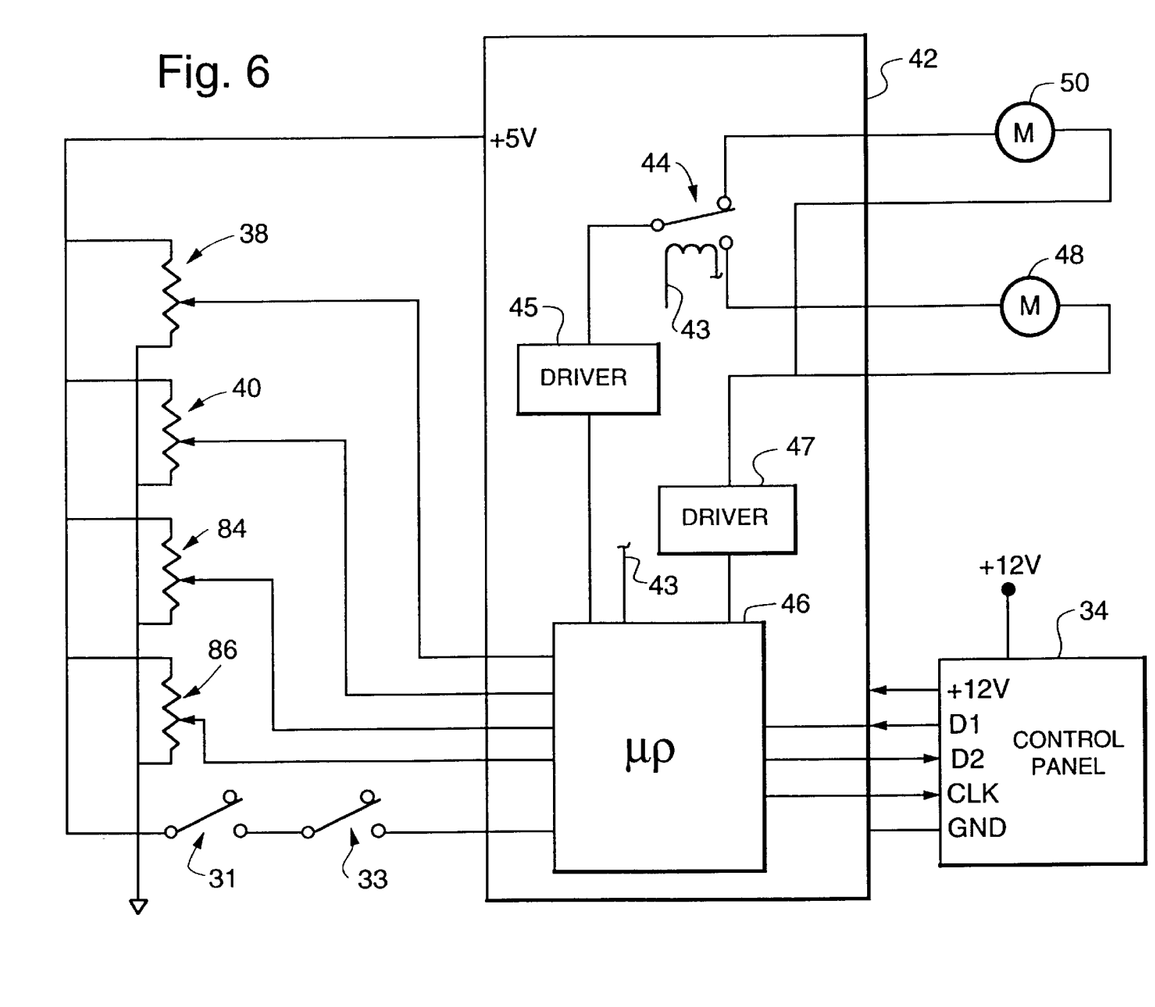
FIG. 6 is a circuit diagram illustrating components of the electrical control system for the baler, the diagram showing only those components necessary for implementing the present invention.

FIG. 6 shows only those details of the baler control circuit relevant to wrapping with twine.

The controller 42 includes a converter circuit (not shown) for converting a +12V battery voltage from a source 49 to +5V for powering the microprocessor, the source voltage being routed to the converter through an on/off switch controlled from an On/Off key 310 on the operator's control panel 34.

The controller 42 also includes an actuator selector relay 44 and driver circuits 45 and 47 controlled by microprocessor 46 to selectively energize a bi-directional twine wrap actuator drive motor 48 or a bi-directional net wrap actuator drive motor 50. Relay 44 and drivers 45 and 47 provide a current for driving either motor in two opposite directions.

The microprocessor 46 is conventional and includes ROM, RAM and EPROM memories and an analog to digital converter in addition to a digital processor. The microprocessor is connected to the operator's control panel by three leads, one lead (CLK) carrying clock pulses to the control panel, one lead (D2) carrying data signals to the control panel and one lead (D1) carrying data signals from the control panel to the microprocessor. The microprocessor periodically samples lead D1 to determine if any key has been actuated and stores a flag or indication in a register or memory when a key is actuated.

Figure 2:
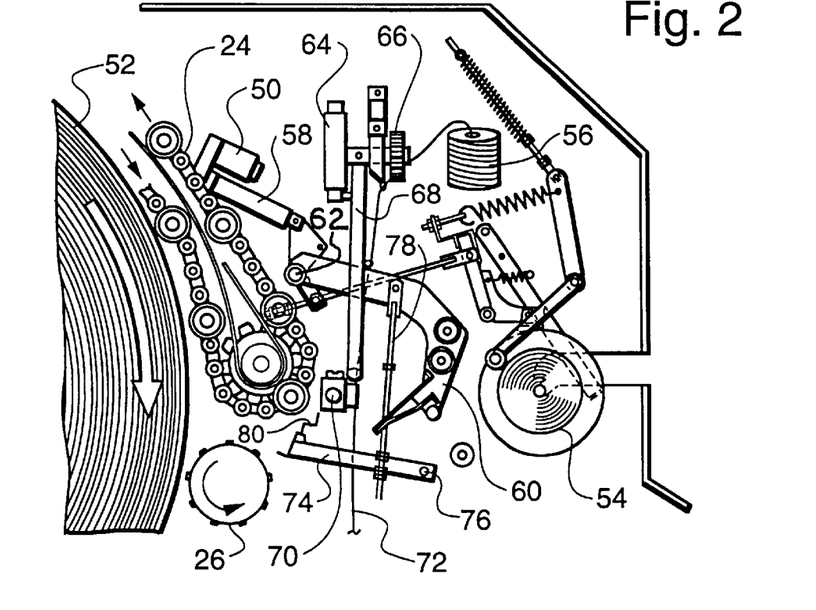
FIG. 2 schematically illustrates the mechanism for feeding and inserting net and twine, as viewed from the right side of the baler, the mechanism being shown in a home position.
Figure 3:
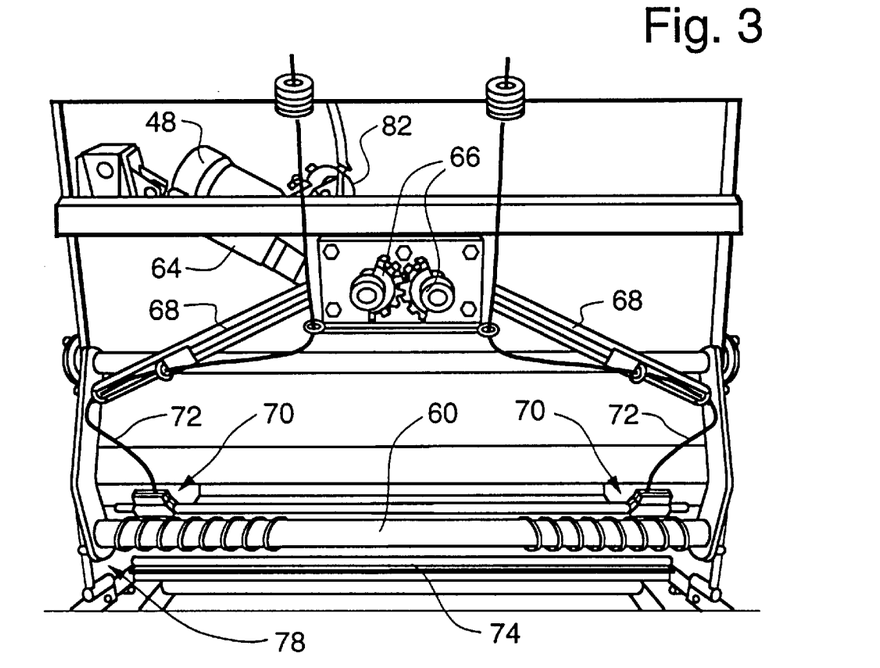
FIG. 3 is a view showing the twine tubes and the twine clamp and hold devices as viewed looking toward the front of the baler, the twine tubes being shown in a home position.

FIGS. 2 and 3 illustrate the wrapping mechanism for wrapping a rotating bale 52 with net from a supply roll 54 or with twine from two supply rolls 56, only one of the supply rolls being visible in FIG. 2. The wrapping mechanism comprises a net wrap actuator 58 driven by the net wrap actuator drive motor 50, a pusher or duckbill 60 mounted on a pivot 62, a twine wrap actuator 64 driven by the twine wrap actuator drive motor 48 (FIG. 6), and two twine dispensing arms 68, illustrated as hollow twine tubes driven by actuator 64 via gearing 66. The wrapping mechanism further includes two spring clamp and stop devices 70 for releasably gripping a respective strand of twine 72, a knife assembly 74 pivoted at 76 and connected to duckbill 60 by a linkage 78, and a shear bar 80 cooperating with knife assembly 74 to cut the twine. The clamp and stop devices are adjustable laterally as viewed in FIG. 3 to thereby adjust the location of end wraps of twine placed on the bale 52.

A sensor 82 (FIG. 3) is mounted on the twine wrap actuator 64 and includes a potentiometer 84 (FIG. 6) for producing a signal indicating the position or extension of the twine wrap actuator. In like manner, a potentiometer 86 (FIG. 6) is provided for producing a signal indicating the position or extension of the net wrap actuator 58.

Figure 4:
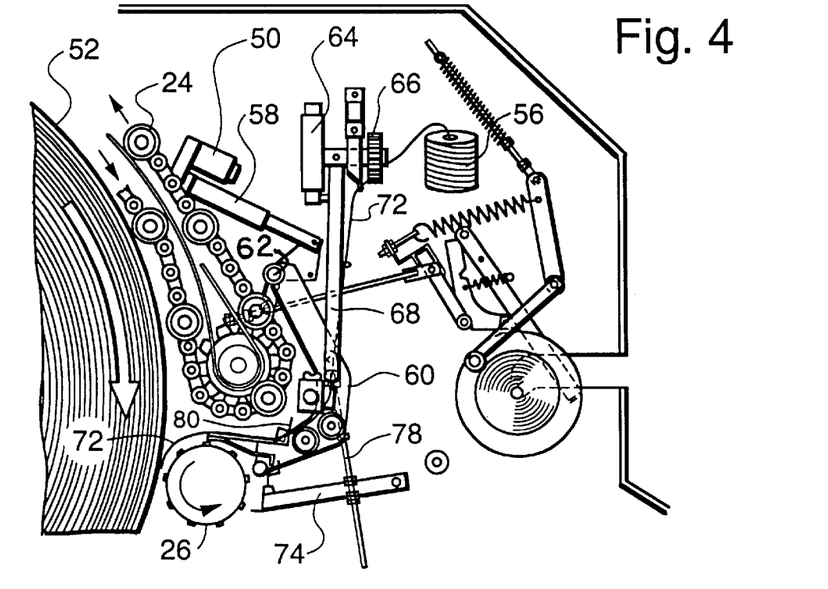
FIG. 4 is a view similar to FIG. 2, the mechanism being shown in a twine insert position.
Figure 5:
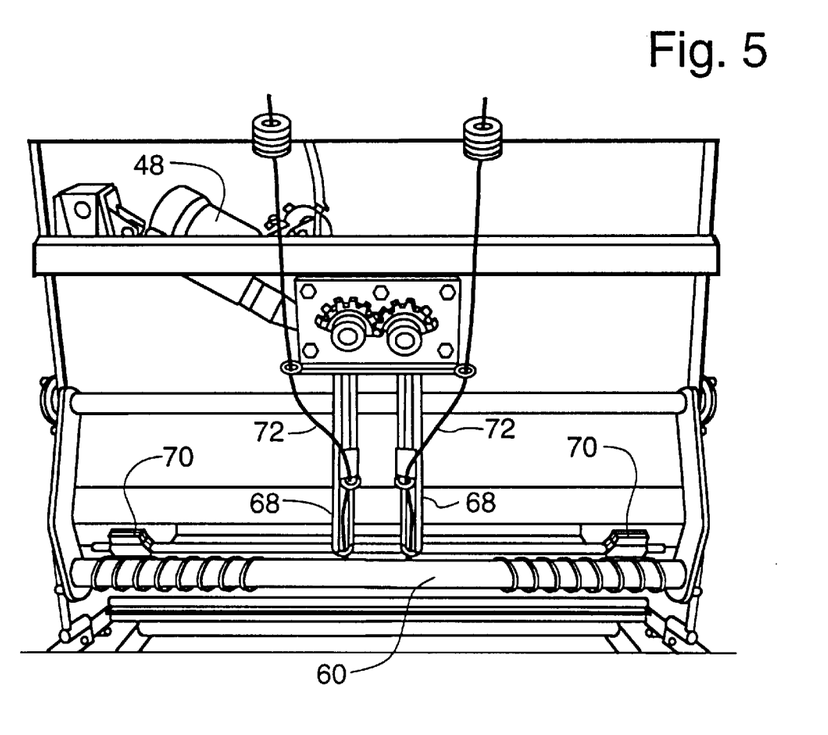
FIG. 5 is a view similar to FIG. 3, the twine tubes being shown in the twine-inserting position.

FIGS. 2 and 3 illustrate the wrapping mechanism in the "home" position, that is, when the net wrap actuator 58 and the twine wrap actuator 64 are fully retracted. FIGS. 4 and 5 show the wrapping mechanism in a twine inserting position with both actuators fully extended so as to present dangling ends of the twine strands to a rotating bale.

According to one aspect of the present invention, the twine wrap actuator 64 is extended prior to the time a complete bale is formed. The twine wrap actuator drives the twine tubes 68 from the home position (FIG. 3) to a twine inserting position (FIG. 5). The twine strands are pulled free of the clamp and stop devices so as to dangle freely from the ends of the tubes. After the bale has been completely formed and the operator has been signaled to stop forward progress of the baler, the net wrap actuator 58 is extended. As the net wrap actuator extends, it pivots duckbill 60 clockwise from the position shown in FIG. 2 to that shown in FIG. 4. The duckbill, via linkage 78, pivots the knife assembly 74 counter-clockwise so that the knife assembly is spaced from the shear bar 80. Further pivoting of the duckbill 60 causes it to engage the dangling twine strands 72, pushing them over the rotating stripper roll 26. The strands are caught up in the rotating bale and begin to wrap around the bale.

After a programmed dwell time allowing the strands to be caught up, the net wrap actuator is retracted to a "precut position". In this position the duckbill 60 is clear of the twine strands but the knife assembly 74 is still spaced from the shear bar 80.

The twine wrap actuator 64 dwells at the fully extended position for a programmed interval to time to place a programmed number of circular wraps on the center of the bale. The twine wrap actuator is then retracted toward its home position, pausing as specified by the program to place circular wraps on the bale. As the twine wrap actuator approaches its home position the twine strands 72 slide into the clamp and stop devices and a programmed number of end wraps are placed on the bale. After a programmed lapse of time to permit placement of the end wraps, the net wrap actuator 58 is retracted from its precut position to its home position. This pivots the duckbill 60 causing linkage 78 to pivot knife assembly 74 clockwise and into contact with shear bar 80 thereby cutting the strands. This completes the wrapping cycle. The bale is ready for dumping from the baler by opening the tailgate 28, and the twine wrapping mechanism is again in the positions illustrated in FIGS. 2 and 3.

Figure 7A:
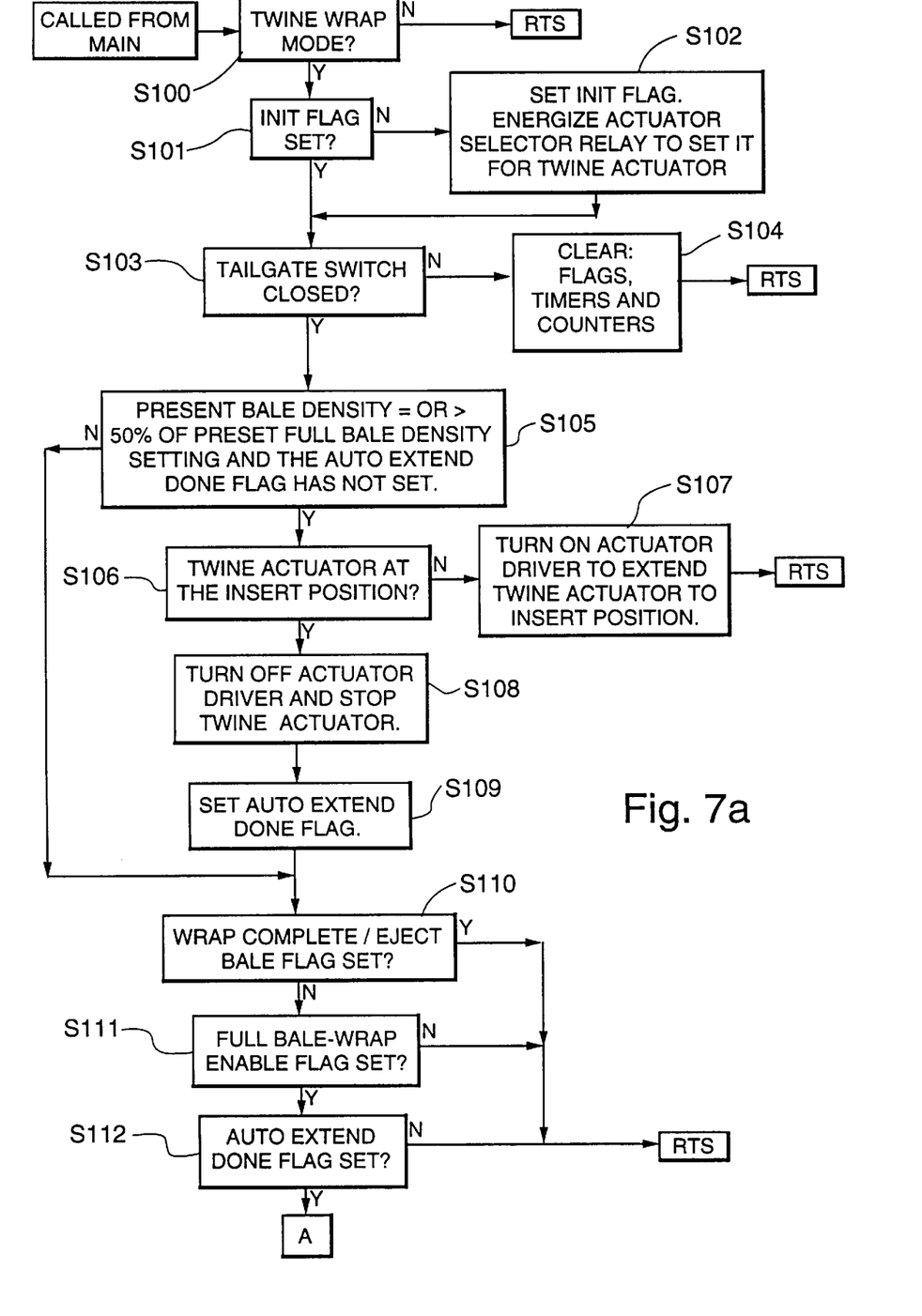
FIGS. 7a–7g comprise a flow diagram illustrating program steps of a bale wrap routine executed by a controller according to the invention; and, FIG. 8 shows the operator control panel.
Figure 7B:
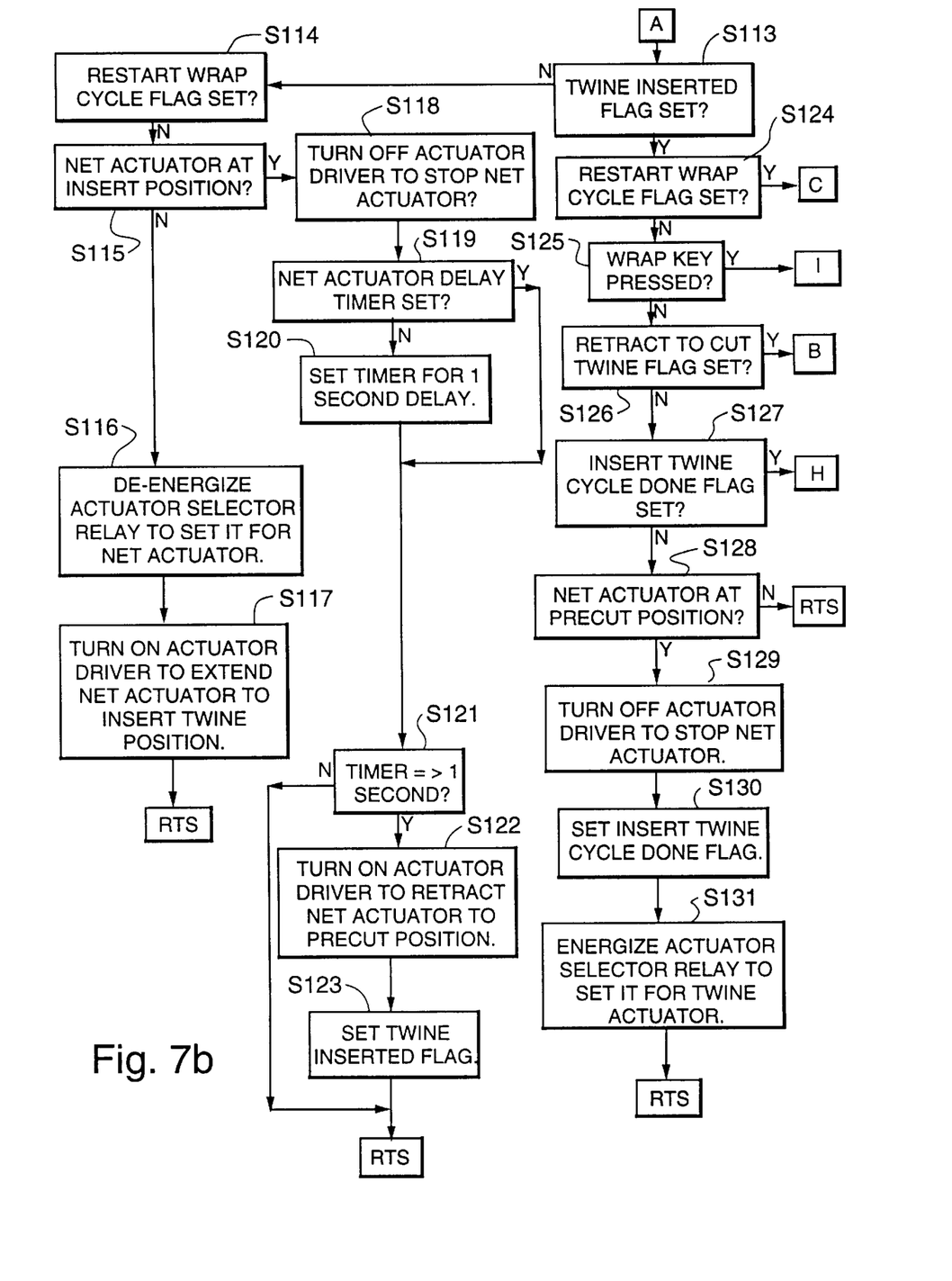

FIGS. 7a–7g comprise a flow diagram of the program routine executed by microprocessor 46 (FIG. 6) to cycle the net and twine wrap actuators as described above and, in the event one or both twine strands 72 are not caught up in the bale, immediately terminating the wrapping cycle and initiating a re-tie cycle if the operator actuates a Wrap key 314 (FIG. 8). In FIG. 7A, the routine is called at about 32.7 ms intervals from a main routine. At S100 (step 100) a test is made to determine if the operator has operated Net/Twine key 312 so as to select the twine wrap mode. If not, a return is made to the main routine but if the twine wrap mode has been selected an Initialize flag is tested at S101.

On the first execution of the routine after the system is powered up, the Initialize flag will be in the reset condition when tested at S101. The flag is set at S102 and the actuator selector relay 44 (FIG. 6) is energized to select the twine wrap actuator motor 48 (FIG. 6) for energization. However, drivers 45 and 47 are not enabled to drive the motor.

At S103 the tailgate switches 31, 33 are tested and if the tailgate is open all flags, except the Initialize flag and various, counters and timers are reset or initialized at S104 before a return is made to the main routine. Thereafter, S100, S101, S103 and S104 are repeated until the tailgate is closed. On the first execution of the routine where S103 determines that the tailgate is closed S105 is executed. This step tests an Auto Extend Done Flag and also compares the present bale density with a density value equal to 50% of the bale density value selected by the operator. The present bale density is determined in a separate routine by sampling the outputs of the bale sensor potentiometers 38 and 40 and the computed present bale density value is saved so that it is available for use at S105.

In the early stages of bale formation, the Auto Extend Done flag is not set. However, the present bale density will be less than 50% of the operator selected bale density so the routine jumps from S105 to S110 which tests a Wrap Complete/Eject Bale flag to determine if it has been set. This flag has not yet been set so a Full Bale-Wrap Enable flag is tested at S111 to determine if it has been set. This flag has not been set so a return is made to the main routine.

As the bale is being formed the routine is periodically repeated, executing S100, S101, S103, S105 and S110–111. Eventually the bale density reaches 50% of the bale density selected by the operator. This condition is detected at S105 and since the Auto Extend Done Flag is not set the routine advances to S106 where the output of the twine actuator sensor potentiometer 84 is sampled to determine if the twine actuator 64 is extended to the twine insert position. Since the twine actuator is still in the home position, S107 is executed to set drivers 45 and 47 to energize the twine actuator drive motor 48 to begin moving the twine actuator toward the twine insertion position. The routine then returns to the main routine.

Although S105 tests for 50% of the desired or preset density this factor is not critical. However, movement of the twine tubes to the twine insert position should be initiated early enough so that the ends of the twine strands are positioned adjacent the rotating bale before the bale density reaches the desired density.

As the twine actuator moves toward the twine insertion position the routine repetitively executes S100, S101, S103 and S105–S107. When the twine actuator reaches its twine insertion position, this is detected at S106 and at S108 the drivers 45, 47 are turned off. The Auto Extend Done flag is then turned on at S109 and S110 and S111 are executed. Since the full bale/Wrap Enable flag is still not set the wrap routine returns from S111 to the main program.

S100, S101, S103, S105, S110 and S111 are periodically repeated as the bale continues to build up. This continues until the subroutine mentioned above determines that a full bale has been formed and sets the Full Bale/Wrap Enable flag. On the next execution of the wrap routine following the setting of the Full Bale/Wrap Enable flag, S111 detects that the flag is set. The routine advances to S112 to test for a set condition of the Auto Extend Done flag. Since this flag has been set the routine advances to S113 in FIG. 7b.

S113 tests a Twine Inserted Flag and since it has not yet been set S114 is executed to determine if a Restart Wrap Cycle flag has been set. The Wrap Cycle Restart flag has not been set so at S115 the output of the net actuator position sensor potentiometer 86 is sampled to determine if the net actuator is at its twine insert position. The net actuator is still in its home position so at S116 the actuator selector relay is deenergized and at S117 drivers 45 and 47 are turned on to energize the net actuator drive motor 50 to drive the net actuator 58 toward its twine insert position. A return is then made to the main routine.

While the net actuator is being driven to its insert position the routine repetitively executes S100, S101, S103, S105 and S110–S117. When the net actuator reaches its insert position this is detected at S115 and at S118 the drivers 45 and 47 are turned off to stop the net actuator.

A delay of one second is provided after the net actuator reaches its insert position to allow the twine to be caught up in the rotating bale. The timer is tested at S119 to determine if it has been set and since it is not initially set it is set at S120 and tested at S121 to determine if it has tolled the 1-second interval. Since the timer has just been set the test at S121 will initially determine that the interval has not elapsed so a return is made to the main routine.

During the time the timer is measuring the 1-second interval the routine repeats S101, S103, S105, S110–S115 and S118–S121. The first execution of S121 following expiration of the 1-second interval detects that the interval has expired. Drivers 45 and 47 are set at S122 to begin driving the net actuator drive motor 50 to move the net actuator to its precut position, and the Twine Inserted flag is set at S123.

On the next following execution of the routine S113 detects that the Twine Inserted flag has been set. A Restart Wrap Cycle flag is tested at S124 and since it has not been set the wrap key 314 is tested at S125 to determine if it is being pressed. Assuming for the moment that the operator is not pressing the wrap key a Retract To Cut Twine flag is tested at S126. This flag has not yet been set so an Insert Twine Cycle Done Flag is tested at S127. This flag has not been set so at S128 the output of the net actuator position sensing potentiometer 86 is sampled to determine if the net actuator 58, which began moving when S122 was executed, has reached its precut position.

Initially, the net actuator is still moving toward the precut position when S128 is executed so the routine returns to the main program. While the net actuator is moving toward its precut position the wrap routine executes S100, S101, S103, S105, S110–S113 and S124–S128 on each repetition. S128 detects when the net actuator has reached its precut position and the routine advances to S129 which turns off the drivers 45 and 47 thus stopping the net actuator. The Insert Twine Cycle Done flag is set at S130 and at S131 the net/twine actuator relay 44 is energized to select the twine actuator drive motor 48 for energization when drivers 45,47 are next turned on.

Figures 7C, 7D:
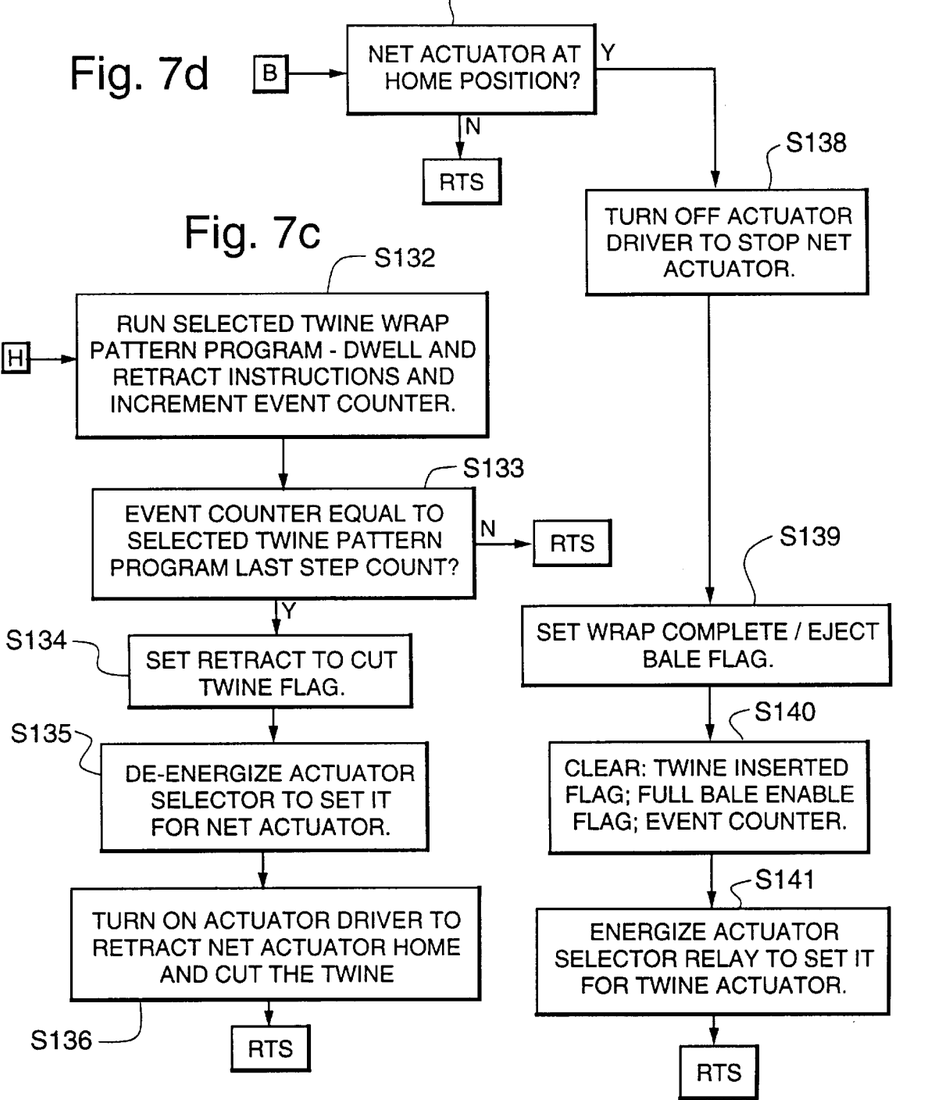
Figure 7E:
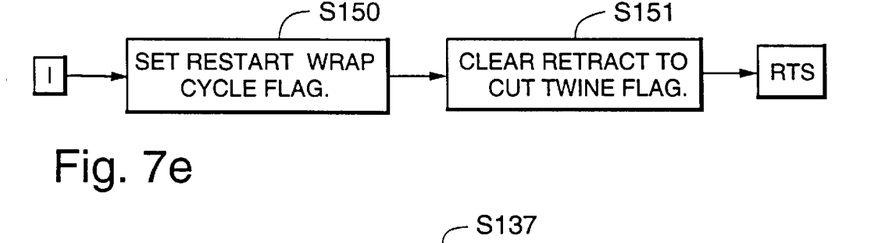
Figure 7F:
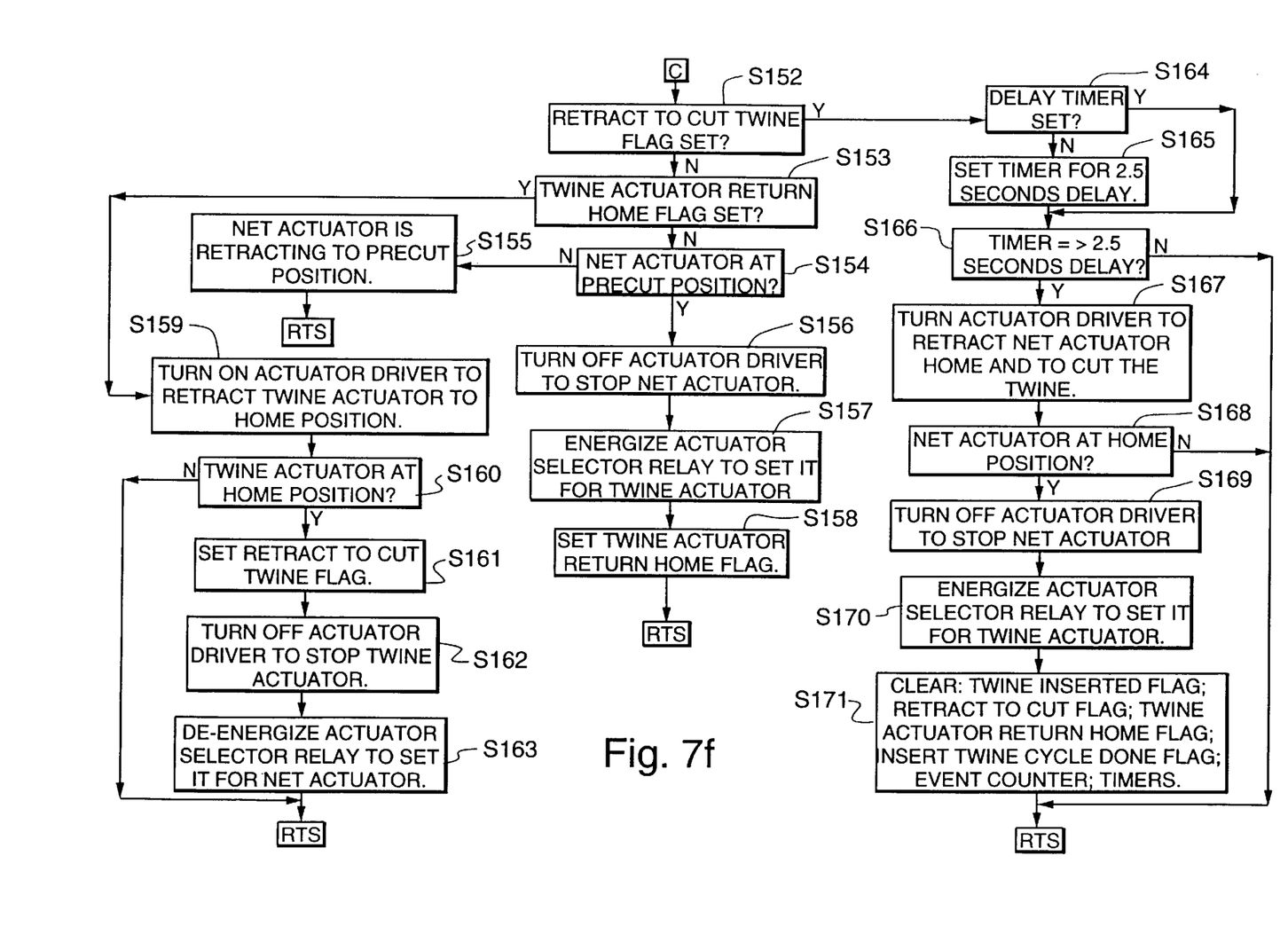
Figure 7G:
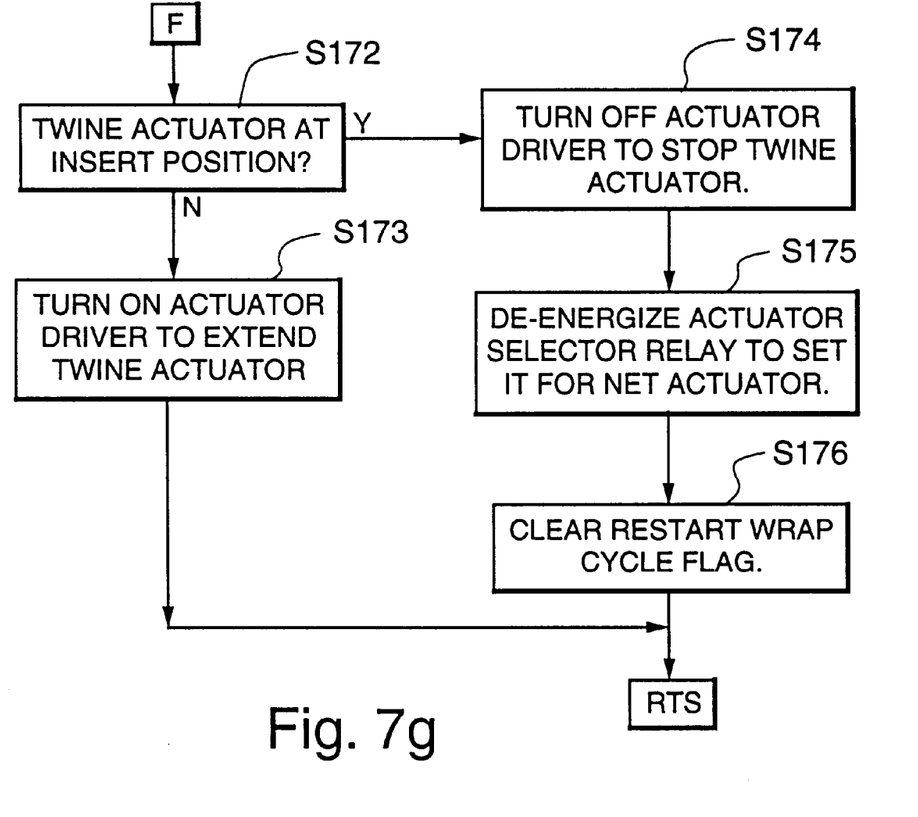

On the next following execution of the wrap routine S127 detects that the Insert Twine Cycle Done flag has been set and the routine branches to S132 in FIG. 7c. During execution of S132 the bale is wrapped according to a selected pattern program comprising a sequence of dwell and retract instructions which cause movement of the twine actuator toward its home position with intermittent dwells or pauses to place circular wraps on the bale. An event counter associated with the program is incremented as each instruction is completed. U.S. Pat. No. 4,609,984 describes in detail the execution of a wrap pattern program.

S133 tests the event counter associated with the pattern program to determine if it is equal to the last pattern program step count. As long as the event counter is not equal to the last step count the wrap routine returns to the main program from S133 but when the event counter is equal to the last step count the Retract To Cut Flag is set at S134. The net/twine actuator selector relay is then de-energized during S135 to select the net actuator drive motor 50 for energization and S136 sets drivers 45 and 47 so that the motor is energized to drive the net actuator 58 toward its home position. This pivots the duckbill 60 toward its home position and the duckbill drives knife assembly 74 to cut the twine. The wrap routine then returns to the main program.

On the next execution of the wrap routine S126 (FIG. 7b) detects that the Retract To Cut Twine flag is now set. The routine branches from S126 to S137 (FIG. 7d) which samples the output of the net actuator position sensor potentiometer 86 to determine if the net actuator has reached its home position. The wrap routine returns to the main program if the net actuator has not reached its home position.

S101, S103, S105, S110–S113, S124–S126 and S137 are repeated until the net actuator reaches it home position. This is detected at S137 and the routine advances to S138 which turns off the drivers 45 and 47 to stop the net actuator. S139 then sets the Wrap Complete/Eject Bale flag and S140 clears the Twine Inserted flag, the Full Bale Enable flag and the event counter. Finally, in preparation for the next bale wrapping cycle S141 energizes the actuator selector relay 44 to set it for the twine actuator drive motor 48. This completes the wrapping cycle. On the next execution of the routine, when S110 (FIG. 7a) is reached, the test of the Wrap Complete/Eject Bale flag finds that the flag is now set so the wrap routine returns to the main program. S100, S101, S103, S105 and S110 are repeated each time the wrap routine is entered. Normally, this continues until the tailgate is opened at which time S103 detects that the tailgate switches are not closed and S104 clears all flags used in the routine.

The foregoing description assumes a normal bale wrapping cycle wherein both twine strands are caught up in the bale. When the operator stops the baler to permit the wrapping operation to take place, he should observe two indicators (not shown) on the front of the baler, each indicator providing an indication of whether or not a respective one of the twine strands is moving. If both strands do not begin to move he should abort the wrapping operation to save both time and twine. In accordance with a second aspect of the present invention this is accomplished merely by pressing the wrap key on the operator's control panel 34.

Actuation of the wrap key is detected at S125 (FIG. 7b) and the routine branches to S150 (FIG. 7e) where the Restart Wrap Cycle flag is set. The Retract To Cut Twine flag is cleared at S151 and the wrap routine returns to the main program.

On the next execution of the wrap routine, the test at S124 finds that the Restart Wrap Cycle flag is set and the routine branches to S152 (FIG. 7f) which tests to determine if the Retract To Cut Twine flag is set. Since the latter flag has been cleared, S153 tests to see if a Twine Actuator Return Home flag is set. This flag has not been set so at S154 the output of the net actuator position sensor potentiometer 86 is sampled to determine if the net actuator is at its precut position. If S154 determines that the net actuator is not at its precut position it means that the net actuator is in the process of retracting to that position. The routine returns to the main program.

As the net actuator is returning to its precut position the wrap routine is periodically executed and the output of the net actuator position sensor potentiometer is sensed at S154. This continues until S154 determines the net actuator has reached its precut position. The drivers 45,47 are then turned off at S156 to stop the net actuator and the net/twine relay 44 is energized at S157 to select the twine actuator drive motor for energization. The Twine Actuator Return Home flag is the set at S158 and the routine returns to the main program.

On the next execution of the wrap routine S153 detects that the Twine Actuator Return Home flag is set so the routine advances to S159 where the drivers 45 and 47 are activated to energize the twine actuator drive motor 48 and drive the twine actuator toward its home position. The output of potentiometer 84 is sampled at S160 to determine if the twine actuator has reached its home position. If the twine actuator is not in its home position the routine returns to the main program.

The wrap routine is periodically executed while the twine actuator is returning to its home position and the output of potentiometer 84 is sampled at S160 on each execution. This continues until S160 determines that the twine actuator is in its home position. The routine then advances to S161 where the Retract To Cut flag is set. S162 then turns off the drivers 45 and 47 to stop the twine actuator and S163 de-energizes relay 44 to select the net actuator drive motor 50. The routine then returns to the main program.

On the next execution of the wrap routine S152 detects that the Retract To Cut flag is set and the routine proceeds to S164 which tests a 2.5 second delay timer to determine if it is set. The timer has not yet been set so S165 sets the timer to begin tolling the delay interval. S166 tests the timer to determine if the 2.5 second delay interval has passed. Since the timer has just been set the test at S166 proves false so the routine returns to the main program.

During the next 2.5 seconds the timer is tested at S116 each time the routine is executed. After the 2.5 seconds has passed the test at S166 proves true and the routine advances to S167 where the drivers 45 and 47 are enabled to energize motor 50 in the direction necessary to drive the net actuator toward its home position. S168 samples the output of potentiometer 86 and determines if the net actuator is in its home position. Since the net actuator is not in its home position the routine returns to the main program from S168.

The routine is periodically executed while the net actuator is returning to its home position and on each execution S168 tests to determine if this position has been reached. When S168 determines that the net actuator is in its home position the routine advances to S169 where the drivers 45 and 47 are turned off to stop it. S170 then energizes the net/twine selector relay to set it for energizing the twine actuator drive motor 48. S171 then clears the Twine Inserted flag, Retract To Cut flag, Twine Actuator Return Home flag, and Insert Twine Cycle Done flag as well as the event counter and various timers. The routine then returns to the main program.

The next time the routine is executed S113 (FIG. 7b) detects that the Twine Inserted flag is reset. The routine advances to S114 and since the Restart Wrap Cycle flag is still set the routine branches to S172 (FIG. 7g) where the output of potentiometer 84 is sampled to determine if the twine actuator is at the insert position. Since the twine actuator is in its home position the routine advances from S172 to S173 where drivers 45 and 47 are turned on to extend the twine actuator. The routine then returns to the main program.

While the twine actuator is moving to its insert position the routine is periodically executed. On each execution S172 samples the output of potentiometer 84. This continues until S172 detects that the twine actuator has reached its insert position. When this occurs the drivers 45 and 47 are turned off to stop the actuator. The net/twine selector relay 44 is de-energized at S175 to select the net actuator drive motor 50. The Clear Restart Wrap Cycle flag is cleared at S176 before the routine returns to the main program.

The wrapping mechanism is now ready to restart the aborted wrap cycle. The twine actuator is at its insert position and the net actuator in its home position. When the routine is next executed, S100, S101, S103, S105, S110–S117 are executed with S117 turning on drivers 45 and 47 to drive the net actuator toward its twine insert position. Sequencing then continues as described above.

A preferred embodiment has been described in detail to illustrate the principles and advantages of the invention. It will be understood that various modifications and substitutions may be made in the described embodiment without departing from the spirit and scope of the invention as defined by the appended claims. For example, the invention has been described as implemented in a baler having two twine dispensing arms each comprised of a hollow tube. The invention may also be used to advantage in balers having a single twine dispensing arm. Furthermore, the twine dispensing arm or arms need not be hollow tubes but may take any form such as solid elongated members having attached rings through which the twine strands pass.

We claim:

1. A bale wrapping system for wrapping a rotating bale of crop material with at least one strand of twine, said bale wrapping system comprising:

at least one twine dispensing arm for presenting at least one strand of twine so that an end of said strand may dangle from said arm, said arm being movable between a home position and a twine insert position where said end of said strand dangles adjacent said rotating bale;

a twine pusher movable toward said rotating bale to push said dangling end of said strand toward said rotating bale;

a sensor for sensing a bale parameter which increases as said rotating bale is being formed so as to reach a desired value when said rotating bale is fully formed; and, a controller responsive to said sensor to control said twine dispensing arm to move from said home position to said twine insert position before said rotating bale is fully formed.

2. A bale wrapping system as claimed in claim 1 wherein said bale parameter is one of the group of bale parameters consisting of bale size and bale density.

3. A bale wrapping system as claimed in claim 1 wherein said bale parameter is bale density and said desired value is applied to said controller via an operator control panel.

4. A bale wrapping system as claimed in claim 3 wherein said controller moves said twine dispensing arm from said home position to said twine insert position when the sensed bale density exceeds about 50% of said desired value.

5. A bale wrapping system as claimed in claim 1 wherein, after said twine dispensing arm has been moved to said twine insert position, said controller is responsive to actuation of a wrap key to abort a wrapping cycle and initiate a new wrapping cycle.

6. A bale wrapping system for wrapping a rotating bale of crop material with strands of twine, said bale wrapping system comprising:

first and second twine dispensing arms each supporting a strand of twine so that a strand end may dangle from each dispensing arm, the twine dispensing arms being movable between a home position and a twine insert position where the strand ends dangle adjacent a rotating bale;

a pusher movable toward said rotating bale to push dangling strand ends toward said rotating bale;

a sensor for sensing a bale parameter which increases as the bale is being formed;

a control panel for presetting a desired bale parameter value representing a fully formed bale; and, a controller responsive to said sensor and said desired bale parameter value for controlling said twine dispensing arms to move said dispensing arms to said twine insert position before the bale parameter sensed by said sensor reaches said desired parameter value, and controlling said pusher to move toward said rotating bale only after the bale parameter sensed by said sensor reaches said desired bale parameter value.

7. A bale wrapping system as claimed in claim 6 wherein, said controller controls said twine dispensing arms to move said twine dispensing arms toward said twine insert position as soon as the bale parameter sensed by said sensor is at least 50% of said desired bale parameter value.

8. A bale wrapping system as claimed in claim 6 wherein said controller comprises a programmable microprocessor.

9. A bale wrapping system as claimed in claim 6 and further comprising a knife assembly driven by said pusher to cut said strands of twine as said pusher is driven to a home position, said controller moving said twine dispensing arms to their home position and moving said pusher to its home position to cut said twine strands after said rotating bale is wrapped with said strands of twine.

10. A bale wrapping system as claimed in claim 9 wherein, after said pusher has been moved toward said rotating bale, said controller is responsive to actuation of a wrap key to abort a wrapping cycle and initiate a new wrapping cycle.

11. A bale wrapping system as claimed in claim 9 wherein said controller is responsive to the pressing of said wrap key after said pusher has been moved toward said rotating bale to automatically sequentially, return said twine dispensing arms to their home position, return said pusher to its home position thereby cutting said strands of twine, move said twine dispensing arms to their twine insert position, and move said pusher toward said rotating bale to push the dangling ends of the strands toward said rotating bale.

12. A bale wrapping system as claimed in claim 6 wherein the bale parameter sensed by said sensor is bale density.

13. A bale wrapping system as claimed in claim 6 wherein said twine dispensing arms are hollow tubes, one strand of twine extending through each tube so as to dangle from an end thereof.

* * * * *